United States Patent
Daugman (10) Patent No.: US 6,753,919 B1
(45) Date of Patent: Jun. 22, 2004

(54) FAST FOCUS ASSESSMENT SYSTEM AND METHOD FOR IMAGING

(75) Inventor: John G. Daugman, Huntingdon (GB)

(73) Assignee: Iridian Technologies, Inc., Moorestown, NJ (US)

( * ) Notice: Subject to any disclaimer, the term of this patent is extended or adjusted under 35 U.S.C. 154(b) by 0 days.

(21) Appl. No.: 09/449,295

(22) Filed: Nov. 24, 1999

Related U.S. Application Data
(60) Provisional application No. 60/109,960, filed on Nov. 25, 1998.

(51) Int. Cl.[7] .......................... H04N 5/232; H04N 7/18; H04N 9/47; G03B 13/00
(52) U.S. Cl. ..................... 348/345; 348/78; 348/346; 348/349; 267/354; 382/117; 396/18
(58) Field of Search .................. 348/78, 346, 349, 348/345; 267/354; 382/117; 396/18

(56) References Cited

U.S. PATENT DOCUMENTS

| | | | |
|---|---|---|---|
| 4,561,747 A | 12/1985 | Ohno et al. ................. 354/402 |
| 4,641,349 A | 2/1987 | Flom et al. .................... 382/2 |
| 4,876,608 A | 10/1989 | Eaton .......................... 358/443 |
| 5,151,583 A | 9/1992 | Tokunaga et al. ......... 250/201.2 |
| 5,193,124 A | 3/1993 | Subbarao .................... 382/41 |
| 5,404,163 A | 4/1995 | Kubo ......................... 348/142 |
| 5,621,519 A | 4/1997 | Frost et al. ............... 356/124.5 |
| 5,664,239 A * | 9/1997 | Nakata ....................... 396/104 |
| 5,710,842 A | 1/1998 | Lee ........................... 382/283 |
| 5,751,836 A | 5/1998 | Wildes et al. .............. 382/117 |
| 5,760,387 A | 6/1998 | Ortyn et al. ............. 250/201.3 |
| 5,763,871 A | 6/1998 | Ortyn et al. ............. 250/201.3 |
| 5,865,832 A * | 2/1999 | Knopp et al. ................. 606/10 |
| 5,892,218 A * | 4/1999 | Ortyn et al. ............. 250/201.3 |
| 5,912,699 A * | 6/1999 | Hayenga et al. ............ 348/132 |
| 5,926,580 A * | 7/1999 | McCoy ....................... 382/279 |
| 5,995,143 A * | 11/1999 | Price et al. ................ 348/345 |
| 6,034,690 A * | 3/2000 | Gallery et al. ............. 345/419 |
| 6,154,574 A * | 11/2000 | Paik et al. .................. 382/255 |
| 2002/0126267 A1 * | 9/2002 | Smith .......................... 355/67 |

OTHER PUBLICATIONS

IriScan, Inc. Webpage, printed from the internet on Aug. 6, 1999, 25 pages.

Sensar, Inc. Webpage, printed from the internet on Aug. 10, 1999, 6 pages.

John Daugman Webpage, Cambridge University, Computer Laboratory, Cambridge, UK, printed from the internet on Sep. 27, 28, and 29, 1999, 34 pages.

* cited by examiner

Primary Examiner—Wendy R. Garber
Assistant Examiner—James Hannett
(74) Attorney, Agent, or Firm—Woodcock Washburn LLP (57) ABSTRACT

An imaging apparatus which can be used to capture high-quality iris images for identification of a person. The iris imager comprises a camera, a cold mirror, a lens, an illuminator, and a focus assessment processor. The imager has sensors and indicators which assist a user in aligning and focusing the device. The imager also automatically captures the image when proper positioning is achieved. The focus assessment processor accesses the image and applies certain measurement routines to assess the focus. The output of the focus assessment processor is used to control an indicator. A template representative of the iris features is extracted and then compared to a database of previously stored templates to identify the person.

23 Claims, 5 Drawing Sheets

FAST FOCUS ASSESSMENT SYSTEM AND METHOD FOR IMAGING

This application claims the benefit of provisional application Ser. No. 60/109,960 filed Nov. 25, 1998.

FIELD OF THE INVENTION

The present invention relates in general to focusing systems. More particularly, the present invention relates to acquiring physical characteristics of a human being or animal in good focus. Even more particularly, the present invention relates to acquiring a focused image of an iris for iris recognition.

BACKGROUND OF THE INVENTION

Video cameras are often used to capture images of moving objects and it is critical, in many applications, to automatically determine when the object is properly focused. The focus information may be used to select a specific video frame to be saved on some analog or digital medium, or processed to extract certain information. The focus information may also be used in a feedback control mechanism to modify the parameters of the optical system and thereby automatically compensate for changes in object position and keep the image in focus.

A challenge in imaging, and particularly iris imaging, is the acquisition of images in good focus. Several known techniques have been used for image focus assessment. In U.S. Pat. No. 4,876,608, entitled "Focus and Signal to Noise Measurement Routines in Input Scanners", issued to Eaton, the focus of an electronic scanner is measured by scanning a test pattern composed of lines, and measuring the total contrast; i.e., intensity range observed across the line pattern. This technique is inconvenient because it requires a special test pattern and only measures one small area of the field of view, that where the test pattern is located. U.S. Pat. No. 5,151,583, entitled "Focus Adjustment Device Having Restricting Means for Restricting a Selecting Action According to the Degree of Nearness of a Distance Measurement", issued to Tokunaga et al., describes the use of a separate distance measurement device to measure the distance to the object, compare it with the distance to the current plane of focus of the optical system, and adjust the focusing optics accordingly. It requires the use of a separate image measurement system which may not operate fast enough to function at video rates, and in any case must be carefully calibrated relative to the optical system to provide accurate focusing. U.S. Pat. No. 5,404,163, entitled "In-Focus Detection Method and Method and Apparatus Using the Same for Non Contact Displacement Measurement", issued to Kubo, describes an algorithm that uses contrast measurements defined as the sum of the nth power of differences in brightness between adjoining pixels. It assesses only localized areas and does not produce an overall assessment of the entire image, and methods for high speed (video-rate) implementation are not disclosed.

When the imaging target is an iris, for the purpose of real-time personal identification, the focusing requirement is especially challenging because of several factors. One factor is the small diameter of an iris (about 1 centimeter). To acquire iris images at reasonable distances, a long (narrow-angle) lens is required. Since the focus depth-of-field of a classical lens system is proportional to its angle-of-view, an iris target will only be in focus over a narrow range of distances.

Another factor is that the iris is a moving target. Eye movements, head movements, and body motion of the subject are inevitable. To prevent motion blur, the video CCD integration time is preferably reduced or strobed. This reduction in light-gathering power at the imaging device leads to a lower optical F/number, and this further reduces the focus depth-of-field.

Yet another factor is the use of restricted wavelengths of illumination. To minimize unpleasantness of the illumination (or even to acquire images covertly), infrared illumination is desirable. But the elimination of most or even all of the visible band further reduces the light energy available at the imaging device, and so further decreases the optical F/number, which in turn reduces focus depth-of-field as above.

Still another factor is that the CCD camera gain (AGC) cannot be greatly increased to allow for higher F/number imaging and thus greater depth-of-field because then CCD noise is amplified, signal-to-noise ratio is reduced, and the discriminable iris information becomes more deeply buried in CCD noise.

Still further, an eye to be imaged will not be positioned initially at any precisely specified distance (as might be achieved, for example, by use of a chin-rest), because of the intrusiveness and inconvenience of any such positioning device. Therefore, image acquisition typically begins in a state of poor focus.

Ideally, a rapid auto-focus lens should be part of an iris recognition system, but current costs for such are prohibitive for most contemplated applications.

Iris identification systems have been developed that are capable of collecting images of the iris and processing them to produce biometric templates. These templates may be used to identify individual irises with extremely low error rates, on the order of 1 in $10^6$. The systems capture the iris images using stationary optical platforms that are often large, complex, and expensive. Prior art systems are difficult to use without minimal cooperation of the subject being identified. As a result, their usefulness in many applications is limited.

Although the art of human recognition systems is well developed, there remain some problems inherent in this technology, particularly the lack of a portable or handheld device specifically designed to solve the problems inherent in capturing a close-up, high-quality, properly focused image of the iris of the eye. Therefore, a need exists for a recognition system that overcomes the drawbacks of the prior art.

SUMMARY OF THE INVENTION

The foregoing disadvantages are overcome by a handheld imaging apparatus which can be used to capture high-quality iris images for identification of a person. The iris imager includes a camera, a cold mirror, a lens, an illuminator, and a focus assessment processor. The imager has sensors and indicators which assist a user in aligning and focusing the device. The imager also automatically captures the image when proper positioning is achieved. The focus assessment processor accesses the image and applies certain measurement routines to assess the focus. The output of the focus assessment processor is used to control an indicator. A template representative of the iris features is extracted and then compared to a database of previously stored templates to identify the person.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

The present invention is directed to a focus assessment processor that can be used with a compact, handheld imaging apparatus to capture high-quality iris images. Throughout the following detailed description similar reference numbers refer to similar elements in the figures of the drawings.

Figure 1:
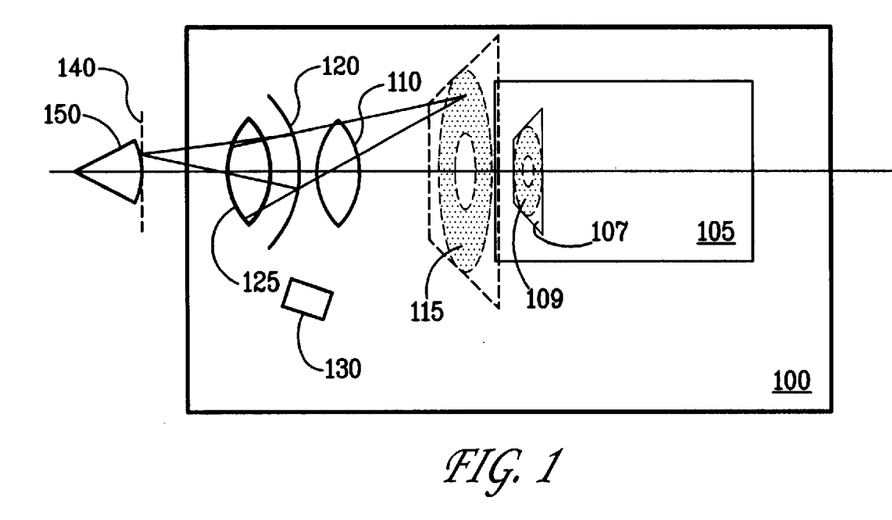
FIG. 1 is a schematic diagram of an exemplary iris imager in accordance with the present invention.

FIG. 1 illustrates a preferred embodiment of the handheld imager 100 constructed in accordance with the present invention. The exemplary handheld, non-invasive, non-contacting iris imager comprises an iris acquisition device 105, an imaging lens 110, a mirror 120, an optional diopter correction lens 125, and an illuminator 130. The imager 100 can be powered by a standard DC or AC supply, and preferably a 9 volt battery (not shown).

The iris acquisition device 105 is preferably a conventional solid state video camera, such as a charged coupled device (CCD) or complementary metal oxide semiconductor (CMOS) device. A preferred camera is a ⅓ inch format, monochrome CCD board camera, such as a Computar model EM200 available from CBC (America) Corporation of Commack, N.Y. Preferably, video camera 105 is sensitive to light of wavelengths in the range of about 400 nanometers to about 1100 nanometers, and is positioned so that its front surface coincides with the image plane of lens 110 in front of it. In the preferred embodiment, the object plane of the lens is approximately 89 mm in front of the lens 110. More preferably, the lens 110 is an optical lens with approximately 14.2 mm focal length.

The mirror 120, preferably a concave cold mirror having a radius of curvature preferably about 276 mm, is disposed on the side of the lens 110 opposite video camera 105 and creates a magnified virtual image of the iris behind mirror 120. In the preferred embodiment, mirror 120 reflects visible light with wavelengths in the range of about 400 to about 700 nanometers, and passes light having longer wavelengths, such as those in the range of about 700 to about 900 nanometers.

The illuminator 130 is positioned just outside the edge of the cold mirror 120 and is used to illuminate the iris of the subject being identified. The preferred illuminator 130 emits light having wavelengths of about 680 to about 900 nanometers. Preferably, the illuminator 130 is a miniature quartz halogen or krypton gas bulb operating at approximately 1 watt.

The imager acquires images of an iris with sufficient clarity, focus, and size for use with conventional image processing and comparison routines. A preferred image processing and comparison routine is described in U.S. Pat. No. 5,291,560, "Biometric Personal Identification System Based on Iris Analysis", issued to Daugman, and commonly assigned with the present invention to IriScan Inc., and incorporated herein by reference. However, any processing and comparison technique can be used with the image that is acquired at the imager, such as the image pixel correlation technique described in U.S. Pat. No. 5,572,596, "Automated, Non-Invasive Iris Recognition System and Method", issued to Wildes et al. and the techniques described in U.S. Pat. No. 4,641,349, "Iris Recognition System", issued to Flom et al., both of which are incorporated herein by reference.

The lens 110 gives a high resolution image of the eye 150 of the user, positioned in front of the lens 110, so that extreme proximity between the eye 150 and the imager 100 is not required (i.e., no contact is needed between the subject and the imager 100).

As shown in FIG. 1, imager 100 comprises a solid-state image capture device and an optical system which forms an image 109 of the iris on the image capture device at the image plane of the video camera 105 and at the same time produces a virtual image 115 of the iris which the user can use to position and focus the iris image. As a result, using the same eye being imaged, a user can see a reflected image of the iris which reflected image can be used to position the handheld imager 100 so that a good iris image (i.e., an image that can be processed and compared to those stored in a database) can be obtained.

FIG. 1 also shows an optional dioptric correction lens 125 positioned between the eye 150 and the cold mirror 120. Dioptric correction lens 125 is an adjustable optical element which corrects for the close-range focusing ability of the individual eye, which varies from subject to subject. When the lens 125 is properly adjusted, the magnified, reflected virtual image 115 of the subject's eye appears in sharp focus to the subject at the eye-to-mirror distance necessary for the subject's eye to be sharply focused on the front surface of the camera. This simplifies use of the imager, because the subject simply positions the image so that the virtual image 115 of the iris appears sharply focused.

A preferred embodiment of the dioptric correction mechanism has no correction lens 125 and instead has a mechanical means (not shown) for adjusting the position of the cold mirror 120 relative to the camera lens 110. This allows the user to vary the object distance of the cold mirror 120, thus changing the eye-to-lens distance at which the virtual image 115 of the iris is sharply focused.

The ability to set the dioptric correction mechanism to accommodate a particular user has a great utility if the imager is used by only one person most of the time. Once the correction is set, the user can easily position the device to obtain a sharply focused reflected image. This automatically produces a sharply focused image from the camera and substantially immediate acceptance of the image by the focus assessment processor described below. Image capture time is thereby reduced and overall convenience and utility is enhanced.

An eye 150 is positioned in front of the imager 100 (e.g., about 3.5 inches in front), as shown in FIG. 1, and the illuminator 130 is turned on. This, in turn, illuminates the eye 150 and the iris therein. Preferably, the light having wavelengths of about 400 to about 700 nanometers is reflected by the cold mirror 120, thereby forming a magnified virtual image 115 behind the mirror 120 which the user can see through the eye being imaged. The radius of curvature of the mirror is selected so that the magnified image 115 of the eye substantially fills the user's entire field of view. Hence, when the imager 100 is positioned so that the entire eye 150 is visible, it is virtually assured that the eye 150 will be substantially centered in the object plane 140 of the camera 105. Under these conditions, the light having wavelengths of about 700 to about 900 nanometers is passed by the mirror 120 and forms an approximately centered image 109 of the eye 150 at the image plane 107 of the camera 105. The image is then captured and processed, as described below.

Although a cold mirror (one which reflects shorter wavelengths and passes longer wavelengths) is described herein, it is understood that a hot mirror (one which reflects longer wavelengths and passes shorter wavelengths) could also be used in accordance with the present invention.

The imager 100 of FIG. 1 is used in a system to identify the iris image that has been captured. The eye is illuminated, an acceptable or suitable image of the iris is obtained, and the image (or a template of the image) is compared to pre-existing images (or to pre-existing templates) in a memory or database for identification of the subject. The system processes the image and compares it to stored images (or templates) to identify the iris, and thus, the user. Image processing algorithms are used to extract a fixed length template (e.g., about 512 bytes long) from each iris image. Iris images are compared by determining the percentage of bits in each template that match. If the percentage of bits that match exceeds a predetermined threshold (e.g., 75%), then it is determined that the iris images being compared belong to the same iris, thereby identifying the subject being tested.

Figure 2:
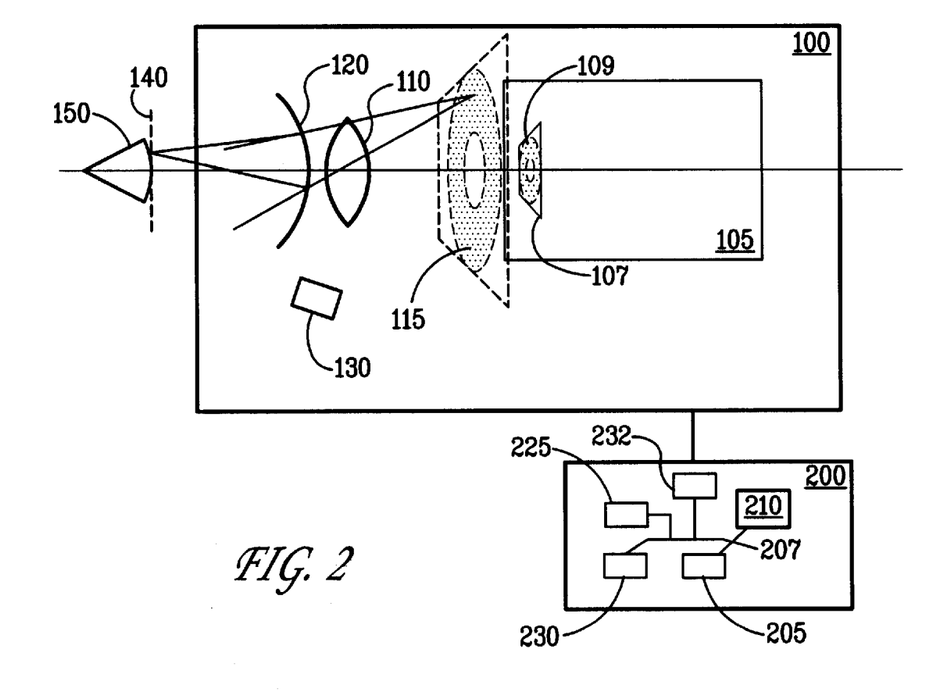
FIG. 2 is a schematic diagram of an exemplary iris image recognition system in accordance with the present invention.

FIG. 2 is a schematic diagram of an exemplary iris image recognition system in accordance with the present invention. The imager 100 is coupled to a microprocessor 210 that performs the processing and comparison. The microprocessor 210 can reside in a conventional computer 200, such as a standard personal computer (e.g., 100 MHZ, 32 Mbyte DRAM, monitor, keyboard, ports, hard drive, floppy drive, CD-ROM drive), as shown, or within an IrisEngine manufactured by IriScan Inc., Marlton, N.J.

The microprocessor 210 is coupled to the imager 100 via conventional cables and/or printed circuit boards (PCBs) that are connected into slots on the computer such as an ISA slot or a PCI slot. Other conventional means for coupling the imager 100 and the microprocessor 210 can be employed, as would be understood by those skilled in the art. The microprocessor 210 controls the imager 100 and runs software held in read only memory (ROM) 205. The processor 210 is connected via a bus 207 to the ROM 205, a random access memory (RAM) 232, another memory such as an erasable programmable ROM (EPROM) 230, and an input/output (I/O) controller 225. The RAM 232 is large enough to hold at least one captured image of an iris. The I/O controller 225 is connected to the appropriate circuitry and drivers (not shown) for issuing commands to control the imager 100.

The imager 100 preferably transmits the images in RS170 format to a frame grabber PCB, such as the PixLink VGX2MB frame grabber PCB, for image processing; or provides the digital images directly to the processing unit 210. "On/off" data is transmitted from the imager 100 to the processor 210 to initiate the image acquisition function. A digital image could be provided if a digital camera is used. Preferably, for an analog video camera, data is analog RS170 from the camera 105 to the frame grabber PCB, or digital from a digital camera to the microprocessor 210, and digital for all other functions.

The image processing consists of a number of image processing steps (such as those described in U.S. Pat. No. 5,291,560 and U.S. Pat. No. 5,572,596, which are herein incorporated by reference) which lead to extraction of a unique and highly specific digital biometric template that can be used to identify the individual based on intensity patterns within the iris. The biometric template is then compared against other templates or images stored in a memory (such as a RAM or EPROM) 230 within the computer 200. The memory 230 stores selected data representing images of the iris of a plurality of subjects. A match of the biometric template with a template stored in the memory 230 identifies the subject whose iris is being imaged.

Although an image of the eye is reflected back to the subject in mirror 120, this may not provide the desired feedback to the user to enable the user to properly position the imager so that a suitable iris image is obtained. For example, a user may be a novice in using and positioning the imager 100 with respect to the eye 150, or the user may be attempting to image the eye of another subject with the imager. Thus, preferably, the imager 100 comprises a passive feedback mechanism to guide the user in positioning the eye 150 to an optimum location to allow acquisition of a suitable image.

Figure 3:
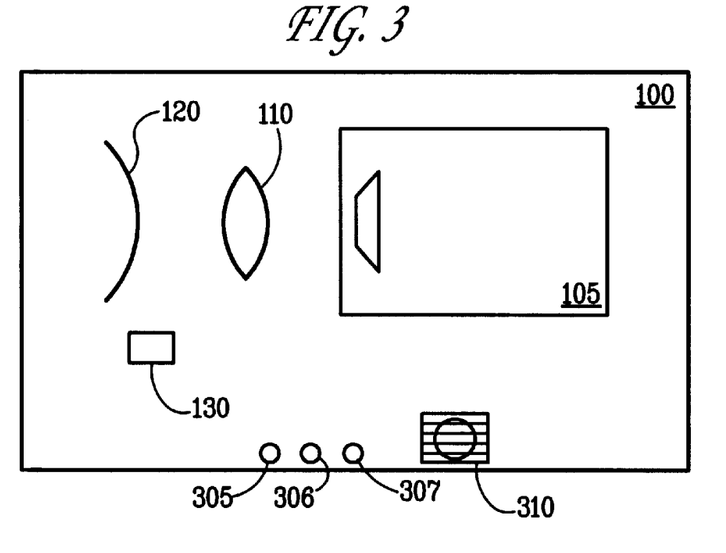
FIG. 3 is a schematic diagram of an exemplary iris imager having visual and aural indicators in accordance with the present invention.

The passive feedback mechanism is an indicator or combination of indicators that provides, on a near real-time basis, an indication to the user that an adequate iris image has or has not been obtained. FIG. 3 is a schematic diagram of an exemplary iris image recognition system that includes position indicators in accordance with the present invention. Preferably, the indicator is visible and/or audible, such as, for example, an indicator lamp 305 (e.g., a light emitting diode (LED)) that lights when an acceptable image has been captured (i.e., "image acquired")? and a aural indicator via a speaker 310, such as a beep or other tone, that sounds periodically until an acceptable image has been captured (i.e., "imaging in progress").

Additional indicators 306, 307 can be also be used, either alone or in combination, for such indications as "subject identified—accept" and "subject not identified—reject". These indications would be activated pursuant to the results of the processing and comparison performed at the microprocessor 210, as described above with respect to FIG. 2.

The imager 100 also preferably has an on/off switch (not shown), such as a pushbutton, for powering up the imager and initiating the image acquisition process. Power for the imager 100 is preferably supplied by a battery, but can also be supplied externally, such as, for example, from the computer 200 comprising the microprocessor 210. The imager 100 receives and acts on instructions from the processor 210 to perform functions such as lighting or turning off the indicator lamp(s) 305, providing the audible signals via the speaker 310, and lighting the 'accept' and 'reject' indicators.

It should be noted that the imagers of FIGS. 2 and 3 can also contain the optional dioptric correction lens 125, described above with respect to FIG. 1.

Figure 4:
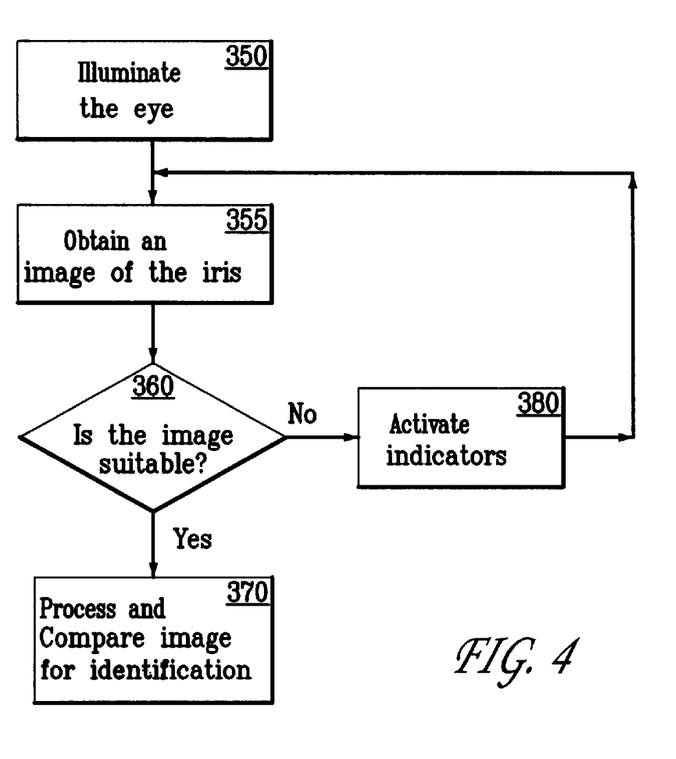
FIG. 4 is a flow chart of a method of operation in accordance with the present invention.

FIG. 4 is a flow chart of a method of operation in accordance with the present invention. The eye is illuminated at step 350 and an image of the iris is obtained at step 355. At step 360, it is determined if the image is suitable for use with the image processing and comparison routines. If the image is suitable, the image is passed to the processor for further processing and comparison, at step 370. If the image is not suitable, at step 380, the indicator(s) is activated (e.g., a beep sound is issued), and processing continues at step 355 (i.e., another image is obtained).

Figure 5:
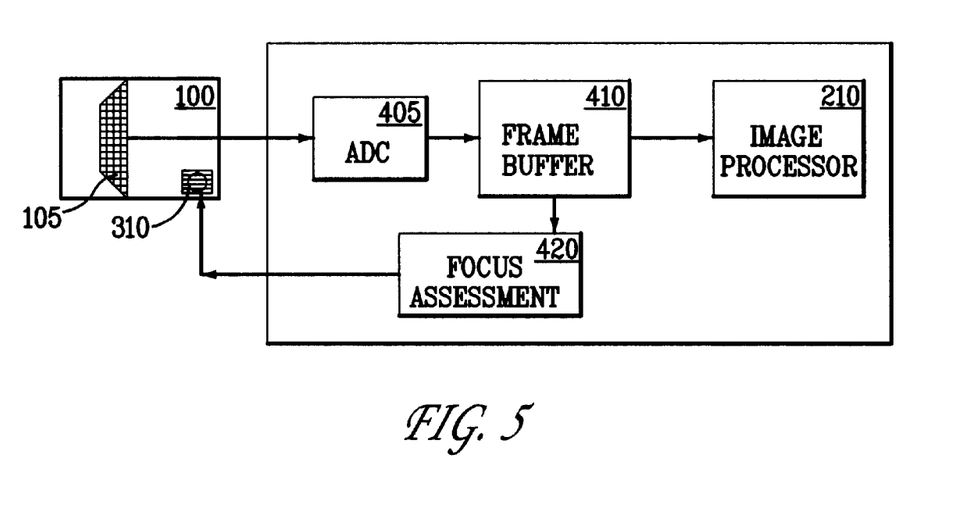
FIG. 5 is a schematic diagram of an exemplary iris image recognition system having a focus assessment processor in accordance with the present invention.

Because the eye's own focusing system automatically adjusts to bring the virtual image 115 into sharp focus to the user, it cannot be relied upon to always accurately focus the eye image on the camera 105. For this purpose, an external focus assessment system is used in one embodiment, as shown in FIG. 5. Video image information from the handheld imaging device 100 is received as an analog video signal which conforms to a standard format such as NTSC or PAL. In these formats video frames are transmitted at a rate of 25 (PAL) or 30 (NTSC) frames per second. The analog image data is transmitted to an analog-to-digital converter 405 and stored in a frame buffer memory 410, such as a RAM similar to RAM 232 described above with respect to FIG. 2, and capable of storing one complete frame of digitized video information. A focus assessment processor 420 accesses the digitized image information and applies certain measurement routines which are described below. The output of the focus assessment processor 420 is used to control an indicator, such as the audible indicator 310. As long as the focus assessment processor 420 determines that the captured image is not acceptable for further processing and comparison, the audible indicator 310 is directed to emit periodic sounds to alert the user. Images are repeatedly acquired and assessed until an acceptable one is received. After an acceptable iris image has been received, the audible indicator 310 is turned off and the final image is retained for further processing and comparison, for example, by the microprocessor 210, as described above.

With respect to the preferred system and method for focus assessment in accordance with the present invention, a focus score is computed for each video frame (i.e., each captured image). If the focus score exceeds a predetermined value, then it is determined that the image is focused enough for further processing and comparison. If the focus score does not exceed the predetermined value, then it is determined that the image is not focused enough for further processing, and an indicator (such as indicator 310, described with respect to FIG. 3) is activated and a further image is captured. Alternatively, a sequence of image frames can be obtained that cycle through a range of focus distances strobed at the video frame-rate, and the focus score computed for each frame can enable the selection of the best focused frame within the sequence of frames. For example, by obtaining image frames at each of several different lens settings and then fitting a spline curve to their respective focus scores one can predict the lens position that would deliver substantially the sharpest focus, by setting the derivative of the parameterized spline curve to zero and then solving the equation for position.

Specific implementation features of the preferred focus assessment system and method which enable its real-time operation, include (1) the computation of quantities in the 2D Fourier domain, without needing to compute an actual 2D Fourier Transform of an image (this avoids the need for approximately 2.25 million floating-point operations required for an FFT (Fast Fourier Transform) on a 500×500 pixel image, as the computational complexity of an FFT on n×n data is $O(n^2 \log_2 n)$); (2) only 6,400 integer multiplications (squarings) are performed, which in turn can be eliminated altogether by using small look-up tables; (3) no floating-point operations are used; (4) computation of focus scores is based upon simple algebraic combinations of pixel values within local closed neighborhoods, repeated across regions of the image; and (5) these operations not only allow the algorithm to execute in real-time, but also enable a straightforward implementation in simple, low-cost, hardware devices that could be embedded within a digital camera or frame grabber.

Preferably, the focus assessment processor 420 is fast enough to determine a focus score for each frame in a video image stream in less than the time it takes to acquire a new frame (e.g., approximately 25 ms). The frame-by-frame focus scores can be used to control a moving lens element for rapid and accurate focus control, or alternatively, to select which of several frames in a video stream is the one in best focus. The rapid selection of well-focused video frames for further processing, such as image analysis and pattern recognition, is important in real-time computer vision because it prevents wasting processing time on poorly-focused images.

The preferred focus assessment processor measures the focus quality of video images at standard rates of 25 (PAL) or 30 (NTSC) frames per second.

It is contemplated that the focus assessment processor 420 can be implemented in a general purpose personal computer or by a dedicated, low cost processor which is small enough to be incorporated into the camera electronics.

The processing of a video frame results in the return of an integer value (e.g., on a scale between 0 and 100) reflecting the quality of focus; the larger the value of the integer, the better the focus. A value of 0 indicates a completely defocused image whereas the value of 100 indicates maximum focus quality. A predetermined threshold is used to determine whether an image is sufficiently focused or whether another image needs to be retrieved. For example, values greater than about 40 can indicate sufficient quality of focus to warrant further image processing, while values less than about 40 cause a new image frame to be grabbed, and optional feedback provided to the focusing mechanism, if one exists, or to the subject controlling the camera position (via the indicator 310, for example).

Optical defocus is a phenomenon of the 2D Fourier domain. An image represented as a 2D function of the real plane, I(x,y), has a 2D Fourier Transform F($\mu$,v) defined as shown in equation 1.

$$F(\mu, v) = \frac{1}{(2\pi)^2} \int_x \int_y I(x, y) e^{i(\mu x + v y)} \, dx \, dy \quad (1)$$

In the image domain, defocus is preferably represented as convolution by the 2D point-spread function of the defocused optics. This in turn may be modeled as a Gaussian whose space constant is proportional to the degree of defocus. Thus, for perfectly focused optics, the optical point-spread function shrinks almost to a delta function, and convolution with a delta function causes no change to the image. Progressively defocused optics equates to convolving with a wider and wider point-spread function, which averages together whole neighborhoods of pixels by such a weighting function, thereby producing an increasingly blurred image.

If the convolving optical point-spread function causing defocus is modeled as a Gaussian whose width represents the degree of defocus, then defocus is equivalent to multiplying the 2D Fourier Transform of a perfectly focused image with the 2D Fourier Transform of the "defocusing" (convolving) Gaussian. This latter quantity is itself just another 2D Gaussian but in the Fourier domain, and its space constant ($\sigma$) is the reciprocal of that of the image-domain convolving Gaussian that represented the optical point-spread function. The preferred focus assessment processor uses (1) the duality of convolution and multiplication in the two domains; (2) the fact that a Gaussian has a Fourier Transform which is itself a Gaussian, but with the reciprocal width because of (3) the Similarity Theorem. Thus, the 2D Fourier Transform $D_\sigma(\mu,v)$ of an image defocused to degree $\sigma$ is related to $F(\mu,v)$, the 2D Fourier Transform of the corresponding in-focus image, as given by equation 2.

$$D_\sigma(\mu, v) = e^{-\left(\frac{\mu^2+v^2}{\sigma^2}\right)} F(\mu, v) \qquad (2)$$

From the above equation, the effect of defocus is to attenuate primarily the highest frequencies in the image, and that lower frequency components are virtually unaffected by defocus since the exponential term approaches unity as the frequencies ($\mu$, v) become small. For simplicity, the present description has assumed isotropic optics and isotropic blur, and the optical point-spread function has been described as a Gaussian. However, the analysis can readily be generalized to non-Gaussian and to anisotropic optical point-spread functions, as would be understood by those skilled in the art.

Thus, an effective way to estimate the quality of focus of an image is to measure its total amount of energy in the 2D Fourier domain at high spatial frequencies, since these are the most attenuated by defocus. One may also perform a kind of "contrast normalization" to make such a spectrally-based focus measure independent of image content, by comparing the ratio of energy in the highest frequency bands to that in slightly lower frequency bands. Such spectrally-based energy measurements are facilitated by exploiting Lord Rayleigh's theorem for conserved total power in the two domains, shown in equation 3.

$$\int_{-\infty}^{+\infty}\int_{-\infty}^{+\infty} |I(x,y)|^2 \,dx\,dy = \int_{-\infty}^{+\infty}\int_{-\infty}^{+\infty} |F(\mu,v)|^2 \,d\mu\,dv \qquad (3)$$

Thus, high-pass filtering or band-pass filtering an image at a ring of high spatial frequency (using only convolution in the 2D image domain) and measuring the residual energy, is equivalent to making the corresponding energy measurement in the high frequency bands of the 2D Fourier domain. The appropriate measurements in the 2D Fourier domain to assess focus can be performed without computing a time-consuming 2D Fourier Transform. Indeed, the measurements can be performed without even a single floating-point operation, and even without any multiplications if appropriate convolution kernels and look-up tables are used.

A real-time procedure for focus assessment based on these principles is used in the focus assessment processor 420. It executes much faster than the video frame-rate, and so real-time focus assessments can be made on a frame-by-frame basis. These can be used either to control the position of a focusing lens element, or alternatively as a type of autofocus system in which frames are grabbed at a variety of focal depths in order to select only the best one for processing, or to prevent time being wasted on processing image frames which are assessed to be in poor focus.

The 2D spectral measurements described above can be implemented by convolving an image with the following convolution kernel, in which pixel values within a predetermined region, such as, for example, an (8×8) neighborhood, are added together with the weights indicated in each of the cells:

| -1 | -1 | -1 | -1 | -1 | -1 | -1 | -1 |
|----|----|----|----|----|----|----|----|
| -1 | -1 | -1 | -1 | -1 | -1 | -1 | -1 |
| -1 | -1 | +3 | +3 | +3 | +3 | -1 | -1 |
| -1 | -1 | +3 | +3 | +3 | +3 | -1 | -1 |
| -1 | -1 | +3 | +3 | +3 | +3 | -1 | -1 |
| -1 | -1 | +3 | +3 | +3 | +3 | -1 | -1 |
| -1 | -1 | -1 | -1 | -1 | -1 | -1 | -1 |
| -1 | -1 | -1 | -1 | -1 | -1 | -1 | -1 |

It should be noted that no pixel-by-pixel multiplications are needed in order to impose these weights. Rather, the pixels in the central region are added together, such as the (4×4) square, that sum is tripled, and then all pixel values in the outer two pairs of rows and columns are subtracted from the tripled sum. The result is squared and added to an accumulator, thus implementing the left-hand side of equation (3) above for this local region of the image. The complete (8×8) convolution kernel is then moved to a new position in the image, along a sampling grid that selects every 4th row and every 4th column, and the operation is repeated. Thus, to assess the quality of focus within the central (320×320) region of an image, this set of 64 pixel summations followed by a squaring operation is repeated a total of $(320/4)^{2=6,400}$ times.

In the 2D Fourier domain, the spectral consequences of this operation can be appreciated by examining the 2D Fourier Transform of the convolution kernel above. The kernel is equivalent to the superposition of two centered square box functions, one of size (8×8) and amplitude −1, and the other of size (4×4) and amplitude +4 (for the central region in which they overlap, the two therefore sum to +3). The 2D Fourier Transform of each of these square functions is a 2D "sinc" function, whose size parameters differ by a factor of two in each of the dimensions and whose amplitudes are equal but opposite, because the two component boxes have equal but opposite volumes. Thus, the overall kernel has a 2D Fourier Transform $K(\mu, v)$ which is the difference of two differently-sized 2D sinc functions, as given by equation 4.

$$K(\mu, v) = \frac{\sin(\mu)\sin(v)}{\pi^2 \mu v} - \frac{\sin(2\mu)\sin(2v)}{4\pi^2 \mu v} \qquad (4)$$

Figure 6:
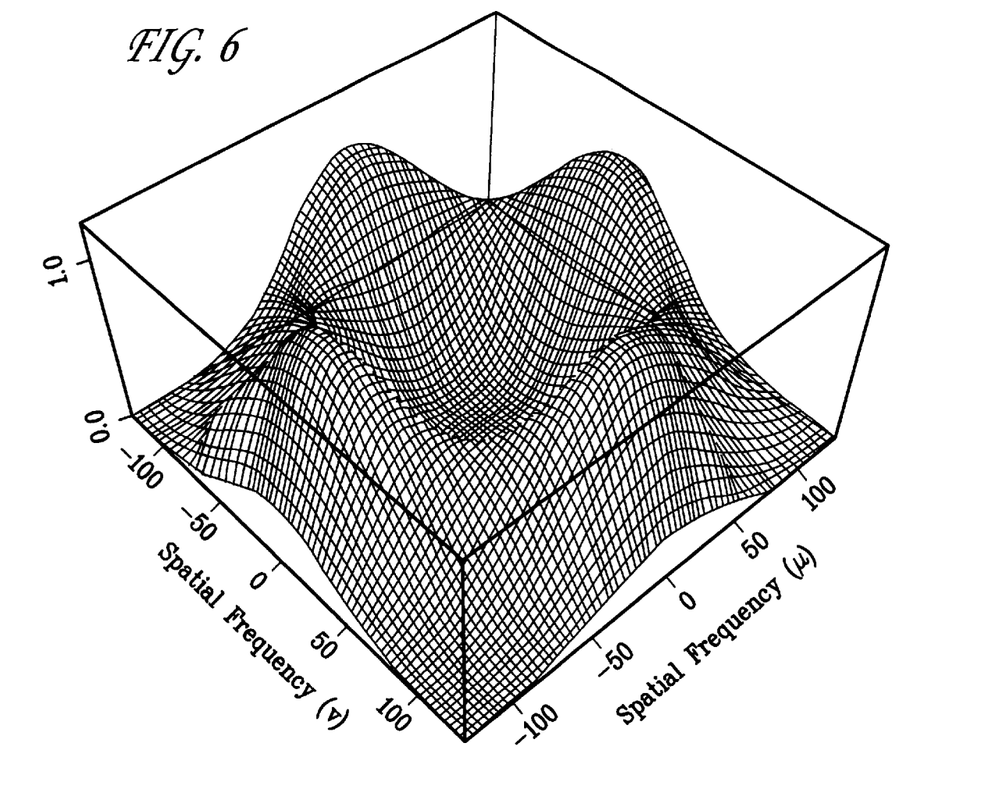
FIG. 6 is a diagram of a power spectrum of a convolution kernel used in accordance with the present invention.

The square of this function of $\mu$ and v in the 2D Fourier domain is plotted in FIG. 6, showing $K^2(\mu,v)$, the convolution kernel's 2D power spectrum. This is a high-pass (or ultimately a band-pass) filter, selecting only a high range of spatial frequencies in all orientations. Towards its center, corresponding to very low spatial frequencies, its value approaches zero (as can also be inferred from the fact that the sum of all pixel weights in the convolution kernel shown above is zero). Thus, low frequencies play little or no role in computing a focus score, and only relatively high frequencies contribute significantly to the computation of a focus score. Equation (3) shows that summing the squares of all the local convolution sums across the image is equivalent to summing the total amount of high frequency energy in the 2D Fourier Transform of the image. The action of the convolution kernel is to impose the above power spectral weighting function so that primarily high frequency energy is measured.

Figure 7:
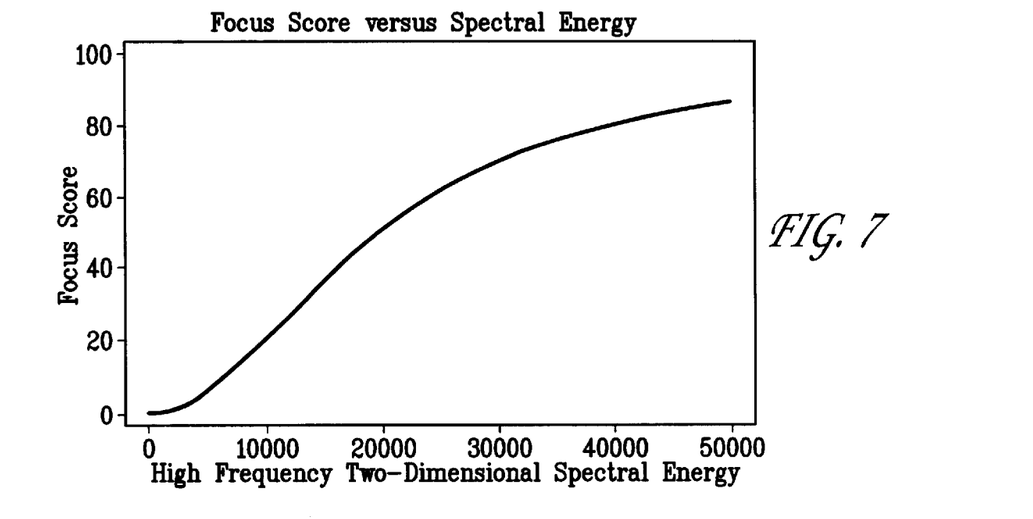
FIG. 7 is a diagram of the focus score versus spectral energy in accordance with the present invention.

The summated 2D spectral energy is then passed through a compressive nonlinearity of the form $f(x)=100\ x^2/(x^2+c^2)$ in order to generate a normalized focus score in the range of 0 to 100 for any image. FIG. 7 shows a diagram of the focus score versus spectral energy in accordance with the present invention.

The focus assessment technique is applied immediately after each image frame is digitized and stored in the frame buffer memory 410 in order to assess whether the focus quality is sufficient to warrant any further processing. If the calculated focus quality value of the captured image is greater than or equal to a predetermined value, the image is passed to applicable programs for further processing, for example for extraction of a biometric template. The focus assessment technique can be used to compare the relative focus of an entire series of images in order to select the one most in-focus (i.e., having the highest focus assessment score), as well as to measure a single image.

The focus assessment technique can be used to provide a feedback indication to a system user who controls the position of the imager relative to the object being imaged. This can be accomplished by activating an indicator which would continue, while successive images are captured and their focus assessed, until the focus assessment score exceeds a predetermined value. At this point, the indicator is deactivated and the last image captured is transferred to the image processor 210 where it is processed to extract the biometric template.

The application of the focus assessment technique in combination with the feedback indicator helps resolve the man-machine interface problems associated with the use of digital imaging devices on the eye. Individuals using the system are provided positive, objective indicators and feedback as to the quality of image focus. The focus assessment processor can also be used in any situation where it is required to determine the quality of focus of video images at industry standard frame rates (NTSC and PAL).

Figure 8:
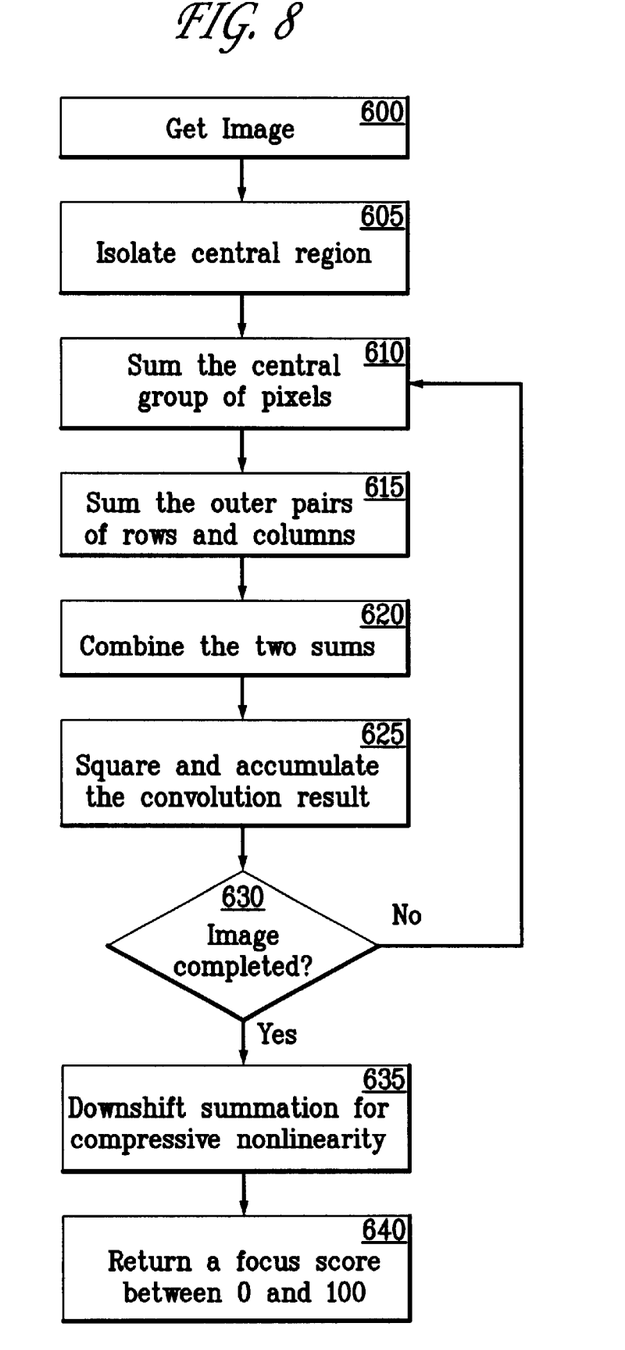
FIG. 8 is a flow chart of a method of operation of focus assessment in accordance with the present invention.

FIG. 8 is a flow chart of an exemplary method of operation of focus assessment in accordance with the present invention. At step 600, an image is obtained at the imager and transmitted to an analog to digital converter 405. The digitized video information is then stored in a frame buffer memory 410. At step 605, the focus assessment processor 420 isolates the central region (e.g., 320×320 pixels) of the image. Pixel blocks (e.g., 8×8 blocks, with each pixel being in only one block) are then processed by first summing pixels in the central region (e.g., 4×4), at step 610. The outer pairs of rows and columns are then summed, at step 615, and are combined in a predetermined ratio, such as 1:−3 with the central region pixel blocks, at step 620. In other words, for example, the sum from step 610 is tripled, and then all the pixel values in the outer two pairs of rows and columns from step 615 are subtracted from this value. This result is then squared, at step 625. This process is performed on each 8×8 block, and the results are summed. After the entire image has been processed, at step 630, the summed result is compressed nonlinearly, at step 635, to generate a focus score, preferably between 0 and 100. This score is then compared to a predetermined number for determining if the indicator 310 should be activated, at step 640.

Figure 9:
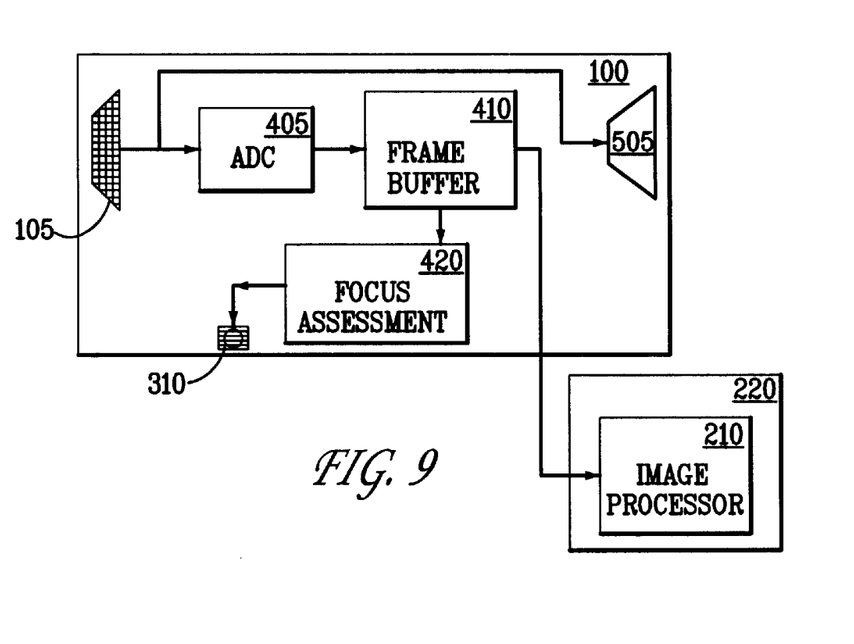
FIG. 9 is a schematic diagram of an exemplary iris imager comprising a focus assessment processor in accordance with the present invention.

The focus assessment can be performed by the microprocessor 210 in the computer 200, or it can be a separate processor element. For example, the focus assessment processor 420 can be disposed within the handheld imager 100, as shown in FIG. 9, and not be external to the imager 100, as shown in FIG. 5. A benefit of this embodiment is that the selection of a properly focused image can occur within the hand-held device, so that only a single, acceptable image is transmitted to the external processor 210. In the embodiment shown in FIG. 5, the focus assessment method is typically performed within a personal computer, so digitized image data is transmitted to the personal computer at video rates. However, the high data rates associated with transmission of digitized video cannot be supported by some types of computers, particularly notebook-style personal computers. If the focus assessment is performed in the handheld device 100, the single selected video frame can then be transmitted at a lower data rate which is compatible with notebook-style personal computers. This greatly enhances the flexibility and versatility of the handheld imaging device of the present invention.

As shown in FIG. 9, the video signal (analog) from the camera 105 is converted to digital format by an analog-to-digital converter 405 and each frame of video is stored in a frame buffer memory 410. The converter 405 and memory 410 are similar to those described above with respect to FIG. 5, but are disposed within the handheld imager 100. Data in the frame buffer 410 is processed by a focus assessment processor 420 which is also contained within the handheld imager 100. The results of the focus assessment control an audible indicator 310 which emits a sound that is discontinued when an acceptable video frame is acquired. The single video frame that has been determined to be acceptable is transmitted to another processor 210 (typically within a personal computer 200) for further processing and comparison.

It is contemplated that in addition to the focus assessment processor, an auto-focus lens system could be used in the present invention. The results of the focus assessment control the lens system, thereby automatically adjusting focus to produce an optimal image. This would place less of a premium on the accuracy with which the user positions the eye, and would be helpful if the user could not see or hear the indicators described above.

Optionally, the imager of the present invention can be equipped with a display, such as a miniaturized back-illuminated liquid crystal display (LCD) 505. The LCD display 505 20 is disposed on the side of the imaging system opposite the subject whose eye is being imaged. The video signal generated by the camera 105 is continuously displayed on the LCD display 505 to permit an operator (other than the subject whose eye is being imaged) to control the position of the hand-held imaging device 100 and thereby center the eye's image in the field of view to more easily achieve proper focus, as indicated by the sound emitted by the audible indicator 310. This allows the device to be used on individuals who are unable or unwilling to cooperate in the image acquisition process. Thus, in accordance with the present invention, either a user can scan his own iris (e.g., for entry to a building) or a user can scan another subject's iris (e.g., for identification).

Although the present invention is described within the context of imaging the iris of the eye for the purpose of extraction of template information for biometric identification, it is contemplated that focus assessment processor and method of the present invention can be used in any other application where quick focus is desired.

Moreover, the focus assessment processor and method of the present invention can be used in any imaging device, not only a handheld imaging device.

Although illustrated and described herein with reference to certain specific embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

What is claimed:

1. A method of assessing the focus of an image, comprising the steps of:
    convolving the image with a convolution kernel comprising:
        (a) isolating one portion of a plurality of portions of said image;
        (b) summing a central group of pixels of said portion to obtain a first sum;
        (c) summing a plurality of outer pairs of rows and columns outside said central group of pixels to obtain a second sum;
        (d) combining said first sum and said second sum in a predetermined ratio; and
        (e) squaring the convolution result;
    determining a spectral energy of said convolved image comprising:
        (f) repeating steps (a)–(e) for further portions of said plurality of portions of said image and accumulating each said convolution result to generate a summation representative of said spectral energy; and
    determining a focus score responsive to said spectral energy, said focus score being indicative of the focus of the image.

2. The method according to claim 1, wherein said step of determining said focus score comprises the step of nonlinearly compressing said summation.

3. The method according to claim 2, wherein said step of nonlinearly compressing said summation is of the form $f(x)=100\ x^2/(x^2+c^2)$, thereby generating said focus score in a range between 0 and 100.

4. The method according to claim 1, wherein said predetermined ratio is −3:1, said first sum:said second sum.

5. The method according to claim 1, further comprising the step of comparing said focus score to a predetermined threshold to assess said focus to determine a focus assessment.

6. The method according to claim 5, wherein if said focus score is not less than said predetermined threshold, then said focus assessment is determined to be acceptable, and if said focus score is less than said predetermined threshold, then said focus assessment is determined to be unacceptable.

7. The method according to claim 6, further comprising the step of activating an indicator responsive to said focus assessment.

8. A iris imaging apparatus for obtaining an image of an iris of an eye and for assessing the focus quality of the image, comprising:
    a camera having a front surface and captures the image;
    a lens having a image plane disposed in front of said front surface of said camera;
    a mirror disposed on a side of said lens opposite said camera;
    an illuminator disposed along a side of said mirror; and
    a focus assessment processor coupled to said camera, said focus assessment processor comprising a microprocessor for convolving the image with a convolution kernel into a convolved image by (a) isolating one portion of a plurality of portions of said image; (b) summing a central group of pixels of said portion to obtain a first sum; (c) summing a plurality of outer pairs of rows and columns outside said central group of pixels to obtain a second sum; (d) combining said first sum and said second sum in a predetermined ratio; and (e) squaring the convolution result; for determining a spectral energy of said convolved image by repeating steps (a)–(e) for further portions of said plurality of portions of said image and accumulating each said convolution result to generate a summation representative of said spectral energy; and for determining a focus score responsive to said spectral energy, said focus score being indicative of the focus quality of the image.

9. The apparatus according to claim 8, further comprising an analog to digital converter and a frame buffer disposed between said camera and said focus assessment processor.

10. The apparatus according to claim 8, further comprising at least one of a visible indicator and an audible indicator, said focus assessment processor coupled to said at least one of a visible indicator and an audible indicator.

11. The apparatus according to claim 8, wherein said microprocessor comprises means for nonlinearly compressing said summation.

12. The apparatus according to claim 11, wherein said means for nonlinearly compressing said summation is of the form $f(x)=100\ x^2/(x^2+c^2)$, thereby generating said focus score in a range between 0 and 100.

13. The apparatus according to claim 8, wherein said predetermined ratio is −3:1, said first sum:said second sum.

14. The apparatus according to claim 8, further comprising means for comparing said focus score to a predetermined threshold to assess said focus to determine the focus quality.

15. The apparatus according to claim 14, wherein if said focus score is not less than said predetermined threshold, then the focus quality is determined to be acceptable, and if said focus score is less than said predetermined threshold, then the focus quality is determined to be unacceptable.

16. The apparatus according to claim 15, further comprising:
    at least one of a visible indicator and an audible indicator, said focus assessment processor coupled to said at least one of a visible indicator and an audible indicator; and
    means for activating said at least one of a visible indicator and an audible indicator responsive to the focus quality.

17. A system for assessing the focus quality of an image, comprising:
    means for convolving the image with a convolution kernel comprising:
        means for isolating one portion of a plurality of portions of said image;
        an adder for summing a central group of pixels of said portion to obtain a first sum;
        a second adder for summing a plurality of outer pairs of rows and columns outside said central group of pixels to obtain a second sum;
        means for combining said first sum and said second sum in a predetermined ratio; and
        means for squaring the convolution result;
    means for determining a spectral energy of said convolved image comprising:
        means for reactivating said means for convolving for further portions of said plurality of portions of said image and accumulating each said convolution result to generate a summation representative of said spectral energy; and
    means for determining a focus score responsive to said spectral energy, said focus score being indicative of the focus quality of the image.

18. The system according to claim 17, wherein said means for determining said focus score comprises means for nonlinearly compressing said summation.

19. The system according to claim 18, wherein said means for nonlinearly compressing said summation is of the form $f(x)=100\ x^2/(x^2+c^2)$, thereby generating said focus score in a range between 0 and 100.

20. The system according to claim 17, wherein said predetermined ratio is −3:1, said first sum:said second sum.

21. The system according to claim 17, further comprising means for comparing said focus score to a predetermined threshold to assess said focus to determine the focus quality.

22. The system according to claim 21, wherein if said focus score is not less than said predetermined threshold, then the focus quality is determined to be acceptable, and if said focus score is less than said predetermined threshold, then the focus quality is determined to be unacceptable.

23. The system according to claim 22, further comprising:
- at least one of a visible indicator and an audible indicator, and means for activating said at least one of a visible indicator and an audible indicator responsive to the focus quality.

* * * * *